United States Patent
Hitomi et al.

(10) Patent No.: US 6,877,464 B2
(45) Date of Patent: Apr. 12, 2005

(54) SPARK-IGNITION ENGINE CONTROLLER

(75) Inventors: Mitsuo Hitomi, Fuchu-cho (JP); Kouji Sumida, Fuchu-cho (JP); Takayoshi Hayashi, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/677,750

(22) Filed: Oct. 3, 2003

(65) Prior Publication Data

US 2004/0129245 A1 Jul. 8, 2004

(30) Foreign Application Priority Data

Oct. 4, 2002 (JP) ......................................... 2002-292875

(51) Int. Cl.[7] ............................................... F02B 41/34
(52) U.S. Cl. ....................... 123/58.8; 123/295; 123/299; 123/301
(58) Field of Search .................... 123/58.8, 64, 295, 123/299, 301, 302, 308

(56) References Cited

U.S. PATENT DOCUMENTS

| 3,924,576 | A | * | 12/1975 | Siewert | ..................... | 123/58.8 |
| 4,194,472 | A | | 3/1980 | Amano et al. | | |
| 4,237,832 | A | | 12/1980 | Hartig et al. | | |
| 4,787,343 | A | * | 11/1988 | Tuckey | ..................... | 123/58.8 |
| 6,543,411 | B2 | * | 4/2003 | Raab et al. | ................ | 123/58.8 |
| 2001/0017123 | A1 | | 8/2001 | Raab et al. | | |

FOREIGN PATENT DOCUMENTS

JP      H10-274085      10/1998

* cited by examiner

*Primary Examiner*—Tony M. Argenbright
(74) *Attorney, Agent, or Firm*—Donald R. Studebaker; Nixon Peabody LLP

(57) ABSTRACT

Intake air/exhaust gas flow control is performed in an partial load range of an engine such that burned gas which is discharged from an exhaust stroke side preceding cylinder of a pair of cylinders having an overlapping exhaust stroke and intake stroke is introduced into an intake stroke side following cylinder through an intercylinder gas channel. In an operating range set as a special operation mode, a combustion condition controller executes control such that combustion is performed in the following cylinder by means of compression ignition. In an operating condition in which knocking is likely to occur within the compression ignition range of the following cylinder, control is executed by a fuel injection controller such that the timing of fuel injection into the following cylinder is retarded relative to that of an operating condition in which knocking is unlikely to occur.

8 Claims, 8 Drawing Sheets

SPARK-IGNITION ENGINE CONTROLLER

BACKGROUND OF THE INVENTION

1. Field of the Invention

The present invention relates to a spark-ignition engine controller, and more particularly to a device for controlling the combustion condition in each cylinder of a multi-cylinder engine in order to improve fuel economy and reduce emissions.

2. Description of the Related Art

Conventional technology for improving fuel economy in a spark-ignition engine by performing combustion with the air-fuel ratio of the air-fuel mixture in each cylinder set to a lean air-fuel ratio which is larger thin the stoichiometric air-fuel ratio is well known. It is also known that by providing a fuel injector for injecting fuel directly into a combustion chamber and performing stratified charge combustion by injecting fuel from the fuel injector in the compression stroke when the engine is being operated in a low-speed low-load range or the like, ultra lean combustion can be realized (see Japanese Unexamined Patent Application Publication H10-274085 for example).

In this type of engine, when a typical three-way catalyst (a catalyst with a good purification performance in respect of HC, CO, and NOx in the vicinity of the stoichiometric air-fuel ratio) alone is used as an exhaust gas purifying catalyst, a sufficient purifying performance cannot be obtained in respect of NOx during a lean operation, and hence, as described in Japanese Unexamined Patent Application Publication H10-29836, a lean NOx catalyst is provided to adsorb the NOx in an oxygen-rich atmosphere and then release and reduce the NOx in a reduced oxygen concentration atmosphere. When the amount of NOx adsorbed by the lean NOx catalyst increases during a lean operation in cases where such a lean NOx catalyst is used, additional fuel is injected in the expansion stroke as well as that used in the main combustion, as described in the aforementioned publication, for example. Hence the air-fuel ratio of the exhaust gas becomes rich and CO is generated, thereby precipitating the release and reduction of the NOx.

In such conventional engines which perform lean operations, the aforementioned lean NOx catalyst must be provided in the exhaust passage to maintain the NOx purification ability during a lean operation, which is not cost-effective. Also, in order to maintain the purification ability of the lean NOx catalyst, the air-fuel ratio must be made temporarily rich due to the additional fuel supply and the like for releasing and reducing the NOx when the amount of adsorbed NOx increases, as described above. If the fuel in use has a high sulfur content, the lean NOx catalyst must be heat processed and regeneration processed by supplying reducing agent or the like in order to prevent sulfur poisoning of the catalyst, and in so doing the effect of an improvement in fuel economy decreases. Furthermore, if the air-fuel ratio of the mixture becomes lean to or above a certain extent, the combustion speed becomes too slow and combustion near the final combustion phase does not contribute to the work. Hence improvements in fuel economy through lean stratified charge combustion are limited.

Compression ignition has been researched as an alternative method of improving fuel economy. In compression ignition, the temperature and pressure inside the combustion chamber are raised in the final phase of the compression stroke, similarly to a diesel engine, whereby the fuel is caused to self-ignite. When such compression ignition is performed, the entire content of the combustion chamber burns at once even when the air-fuel ratio is ultra lean or a large amount of EGR is introduced, and thus slow combustion which does not contribute to the work is avoided, thereby improving fuel economy.

In a typical spark-ignition gasoline engine, however, forced ignition is required for combustion, and thus the temperature and pressure inside the combustion chamber in the vicinity of compression top dead center cannot be raised to an extent at which compression ignition occurs. In order to cause compression ignition, specific measures must be taken to greatly raise the temperature or pressure inside the combustion chamber, but in the past it has been difficult to raise the temperature or pressure inside the combustion chamber to an extent at which compression ignition occurs in the partial load range at which fuel economy improvement is required while avoiding irregular combustion caused by heavy knocking in the high-load range, or in other words spontaneous ignition of the air-fuel mixture before the flame propagates through the combustion chamber.

Hence in order to achieve a great improvement in fuel economy by using lean combustion and compression ignition in combination, the present applicant has filed technology relating to a spark-ignition engine controller according to which, in a partial load range of the engine, a two-cylinder connection is created between a pair of cylinders having an overlapping exhaust stroke and intake stroke such that burned gas discharged from a preceding cylinder in the exhaust stroke is introduced as is into a following cylinder in the intake stroke via an intercylinder gas channel. In the preceding cylinder, the air-fuel ratio is set to a lean air-fuel ratio that is greater than the stoichiometric air-fuel ratio such that combustion is performed by forced ignition, whereas in the following cylinder fuel is supplied to the lean air-fuel ratio burned gas introduced from the preceding cylinder such that combustion is performed by compression ignition (Japanese Patent Application 2002-185242).

SUMMARY OF THE INVENTION

The present invention is based on such technology, and it is an object thereof to provide a spark-ignition engine controller which can effectively enable combustion through compression ignition in a following cylinder in an even greater operating range while suppressing heavy knocking, and hence improve fuel economy and reduce emissions.

An invention according to the present invention relates to a spark-ignition engine controller for a multi-cylinder spark-ignition engine set such that the combustion cycle of each cylinder has a predetermined phase difference, comprising: an operation mode controller for performing control such that a control mode for engine intake, exhaust, and combustion in a partial load range of the engine is set as a special operation mode, and in the special operation mode a two-cylinder connection is maintained in which burned gas discharged in the exhaust stroke of a preceding cylinder of a pair of cylinders having an overlapping exhaust stroke and intake stroke is introduced as is into a following cylinder during the intake stroke thereof through an intercylinder gas channel and exhaust gas discharged from the following cylinder is introduced into an exhaust passage, while combustion is performed in the preceding cylinder at a leaner air-fuel ratio than the stoichiometric air-fuel ratio, and combustion is performed in the following cylinder by feeding fuel to the lean air-fuel ratio burned gas introduced into the following cylinder from the preceding cylinder; a combustion condition controller for performing control such that in the operating range set as the special operation mode, combustion is performed in the following cylinder by compression ignition; and a fuel injection controller which, in an operating condition in a low load range within the compression ignition range of said following cylinder, sets the fuel injection timing into the following cylinder in an intake stroke and which, in an operating condition in a high load range within the compression ignition range of said following cylinder, retards the fuel injection timing into the following cylinder to be in a later half of the compression stroke.

According to the aforementioned form of the present invention, when the special operation mode is set in a partial operating range of the engine and combustion is performed in the following cylinder by compression ignition, the effects of an improvement in thermal efficiency due to lean-burn and an improvement in fuel economy due to a reduction in pumping loss are obtained in the preceding cylinder, and the effects of an improvement in combustion efficiency due to the reduction of cooling loss and cycle loss caused by HCCI under heavy EGR and an improvement in fuel economy due to a reduction in pumping loss are obtained in the following cylinder. When it is confirmed that the engine is in an operating condition where heavy knocking is likely to occur within the compression ignition range of the following cylinder, the timing of fuel injection into the following cylinder is relatively retarded, and thus activation of the air-fuel mixture is suppressed, effectively preventing the occurrence of heavy knocking caused when the ignitability of the mixture is too good. When it is confirmed that the engine is in an operating condition where heavy knocking is unlikely to occur within the compression ignition range of the following cylinder, the timing of fuel injection into the following cylinder is relatively advanced, thereby encouraging activation of the air-fuel mixture. As a result, misfires in the following cylinder are effectively prevented, an improvement in thermal efficiency due to compression ignition is obtained, and the engine output can be sufficiently ensured.

These and other objects, features, and advantages of the present invention will become more apparent upon reading the following detailed description along with the accompanying drawings.

BRIEF DESCRIPTION OF THE DRAWINGS

FIG. 2 is a schematic sectional view of the body of the engine and so on;

DESCRIPTION OF THE PREFERRED EMBODIMENTS

Figure 1:
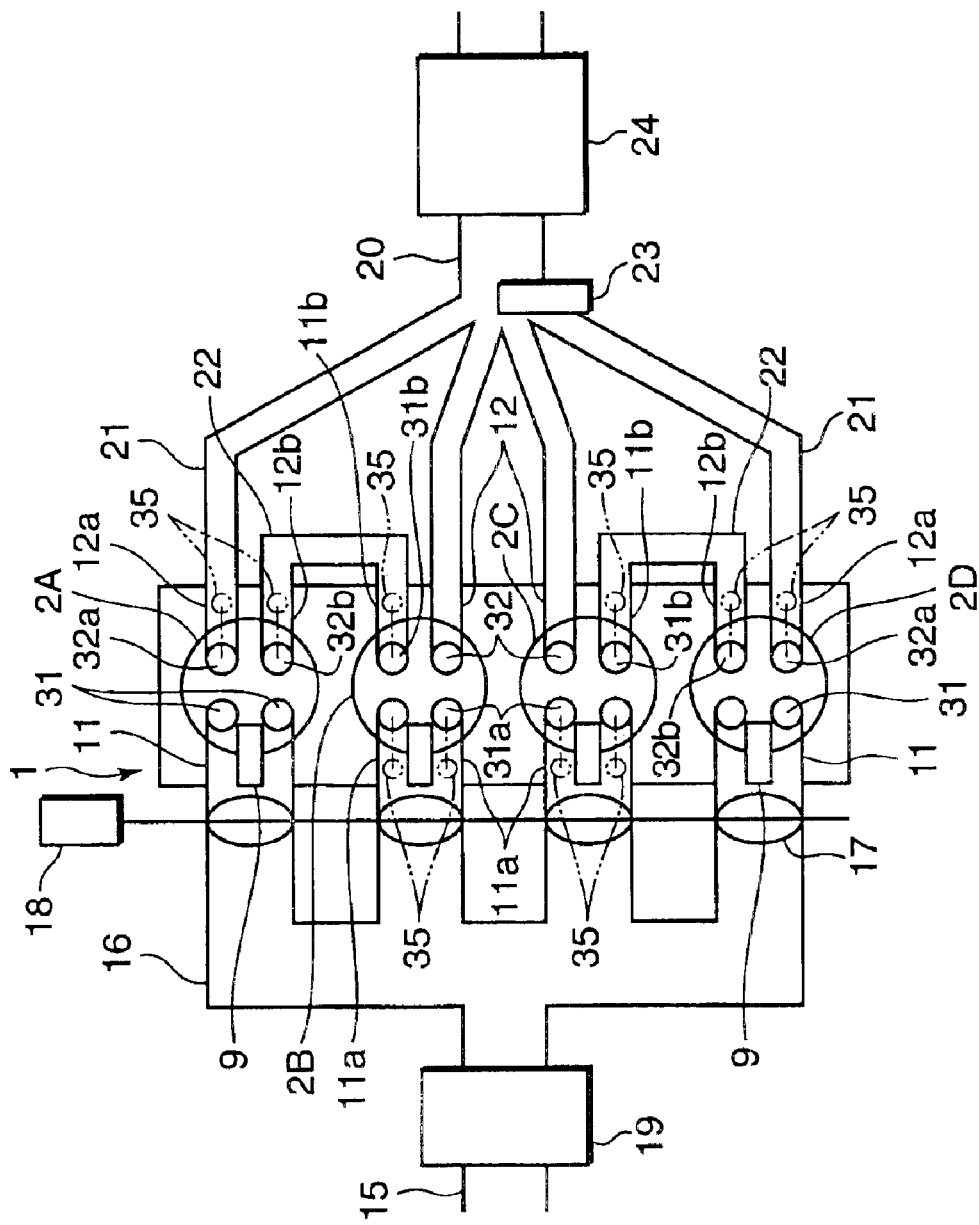
FIG. 1 is a schematic plan view of an entire engine comprising a controller according to an embodiment of the present invention.
Figure 2:
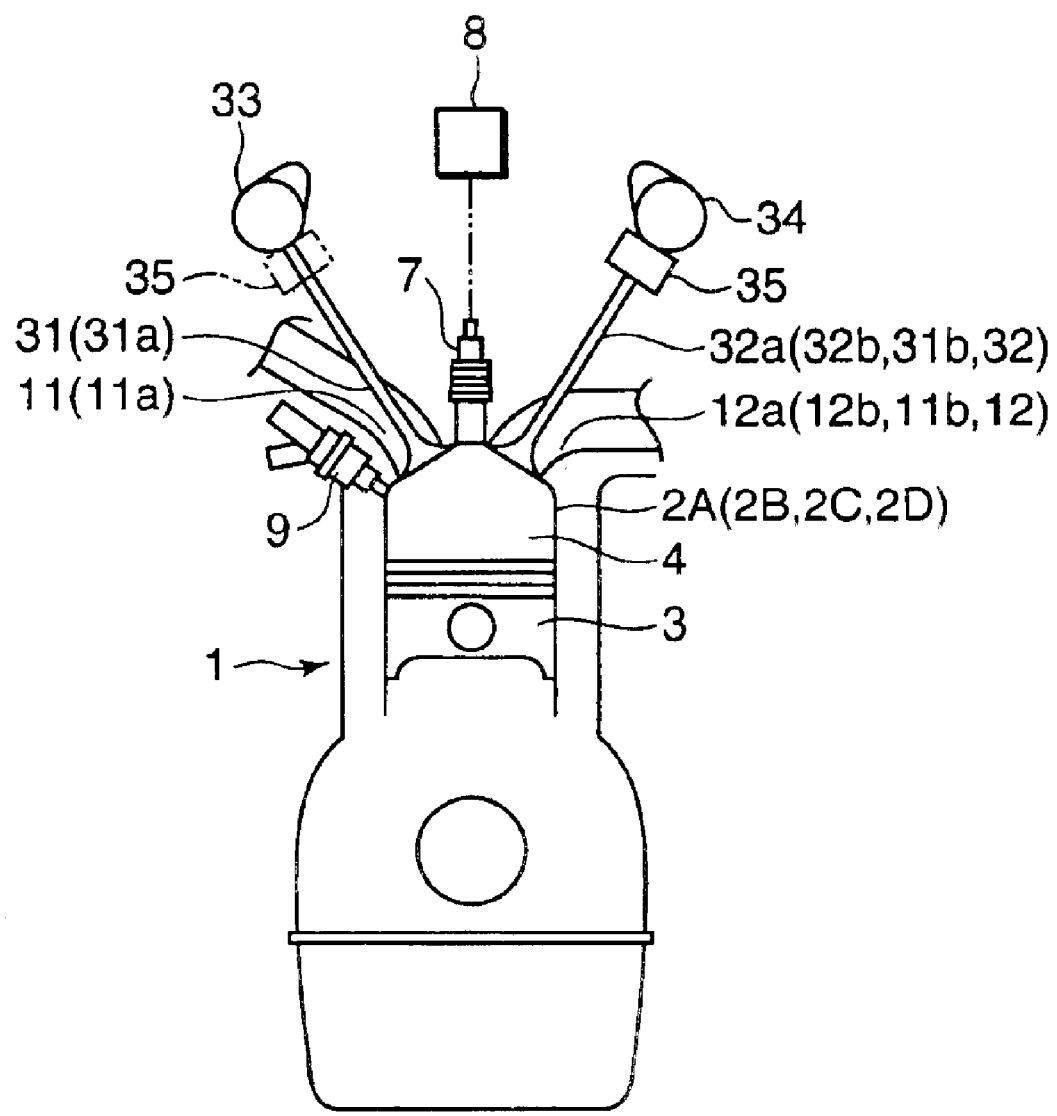

FIG. 1 shows the schematic constitution of an engine according to an embodiment of the present invention, and FIG. 2 shows in outline the constitution of one cylinder of an engine body 1 and an intake valve, exhaust valve, and the like provided thereon. In these drawings, the engine body 1 comprises a plurality of cylinders, and in the illustrated embodiment comprises four cylinders 2A to 2D. A piston 3 is inserted into each of the cylinders 2A to 2D, and a combustion chamber 4 is formed above the piston 3.

A spark plug 7 is provided at the apex of the combustion chamber 4 of each cylinder 2, and the tip end of the spark plug faces the interior of the combustion chamber 4. An ignition circuit 8 which is capable of controlling the ignition timing through electronic control is connected to the spark plug 7.

A fuel injector 9 for injecting fuel directly into the combustion chamber 4 is provided on a side portion of the combustion chamber 4. The fuel injector 9 is equipped with a needle valve and solenoid not shown in the drawing, and when a pulse signal is inputted from a fuel injection controller to be described below, the valve is driven at the time of the pulse input so as to be opened for a length of time corresponding to the pulse width, whereby fuel is injected in an amount corresponding to the time the valve is open. Note that the fuel injector 9 is supplied with fuel from a fuel pump not shown in the drawing via a fuel-feeding passage or the like, and that the fuel-feeding system is constructed so as to obtain a higher fuel pressure than the pressure inside the combustion chamber during the compression stroke.

Intake ports 11, 11a, 11b and exhaust ports 12, 12a, 12b are opened into the combustion chamber 4 of each cylinder 2A to 2D. An intake passage 15, an exhaust passage 20, and so on are connected to these ports, and each port is opened and closed by intake valves 31, 31a, 31b and exhaust valves 32, 32a, 32b.

Figure 5:
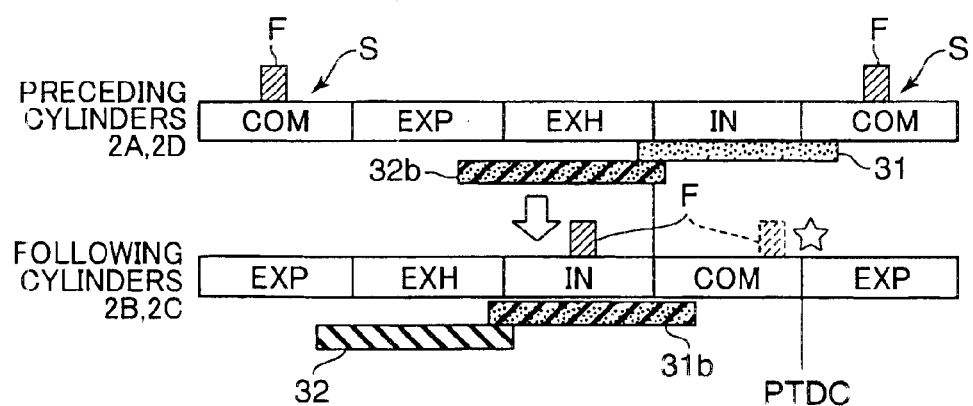
FIG. 5 is an illustrative view showing the combustion cycles of a preceding cylinder and a following cylinder.

A combustion cycle comprising an intake stroke, a compression stroke, an expansion stroke, and an exhaust stroke is performed in each of the cylinders 2A to 2D at a predetermined phase difference. In the case of a four cylinder engine, a first cylinder 2A, a second cylinder 2B, a third cylinder 2C, and a fourth cylinder 2D are provided from one end side in the direction of the row of cylinders, and as shown in FIG. 5, the aforementioned combustion cycle is performed sequentially in the first cylinder 2A, third cylinder 2C, fourth cylinder 2D, and second cylinder 2B at a phase difference of a 180° crank angle each time. Note that in FIG. 5, EX indicates the exhaust stroke, IN indicates the intake stroke, F indicates fuel injection, and S indicates forced ignition. The star-shaped symbols in the drawing indicate that compression ignition (compressed self-ignition) is performed.

An intercylinder gas channel 22 is provided between the pairs of cylinders which have an overlapping exhaust stroke and intake stroke so that burned gas can be introduced as is from the cylinder on the exhaust stroke side (referred to as the preceding cylinder in this specification) when the exhaust stroke and intake stroke overlap to the cylinder on the intake stroke side (referred to as the following cylinder in this specification). In the four cylinder engine of this embodiment, as shown in FIG. 5, the exhaust stroke (EX) of the first cylinder 2A overlaps with the intake stroke (IN) of the second cylinder 2B, and the exhaust stroke (EX) of the fourth cylinder 2D overlaps with the intake stroke (IN) of the third cylinder 2C. Hence the first cylinder 2A forms a pair with the second cylinder 2B, and the fourth cylinder 2D forms a pair with the third cylinder 2C, the first cylinder 2A and fourth cylinder 2D serving as preceding cylinders, and the second cylinder 2B and third cylinder 2C serving as following cylinders.

The intake and exhaust ports of each cylinder and the intake passage, exhaust passage, and intercylinder gas channel connected thereto are constituted specifically as follows.

An intake port 11 for introducing fresh air, a first exhaust port 12a for delivering burned gas (exhaust gas) to the exhaust passage 20, and a second exhaust port 12b for guiding the burned gas to the following cylinder are arranged on each of the first cylinder 2A and fourth cylinder 2D serving as preceding cylinders. A first intake port 11a for introducing fresh air, a second intake port 11b for introducing burned gas from the preceding cylinder, and an exhaust port 12 for delivering the burned gas to the exhaust passage are arranged on each of the second cylinder 2B and third cylinder 2C serving as following cylinders.

In the example in FIG. 1, the intake port 11 in the first and fourth cylinders 2A, 2D and the first intake port 11a in the second and third cylinders 2B, 2C are provided two per cylinder in parallel on the left half side of the combustion chamber, whereas the first exhaust port 12a and second exhaust port 12b in the first and fourth cylinders 2A, 2D and the second intake port 11b and exhaust port 12 in the second and third cylinders 2B, 2C are provided in parallel on the right half side of the combustion chamber.

The downstream end of a branched intake channel 16 for each cylinder on the intake passage 15 is connected to the intake ports 11 in the first and fourth cylinders 2A, 2D and the first intake ports 11a in the second and third cylinders 2B, 2C. Multiple throttle valves 17 which engage with each other through a common shaft are provided near the downstream end of each branched intake channel 16. The throttle valve 17 is driven by an actuator 18 in accordance with a control signal to adjust the amount of intake air. Note that an airflow sensor 19 for detecting the flow rate of the intake air is provided on a common intake passage upstream of the confluence point on the intake passage 15.

The upstream end of a branched exhaust channel 21 for each cylinder on the exhaust passage 20 is connected to the first exhaust ports 12a in the first and fourth cylinders 2A, 2D and the exhaust ports 12 in the second and third cylinders 2B, 2C. An intercylinder gas channel 22 is provided between the first cylinder 2A and second cylinder 2B and between the third cylinder 2C and fourth cylinder 2D respectively, the upstream end of the intercylinder gas channel 22 being connected to the second exhaust port 12b of the first and fourth cylinders 2A, 2D serving as preceding cylinders, and the downstream end of the intercylinder gas channel 22 being connected to the second intake port 11b of the second and third cylinders 2B, 2C serving as following cylinders.

The intercylinder gas channel 22 described above is a comparatively short channel connecting adjacent cylinders, and thus the amount of thermal radiation generated while the burned gas discharged from the preceding cylinders 2A, 2D passes through the intercylinder gas channel 22 can be suppressed to a comparatively low level.

An $O_2$ sensor 23 for detecting the air-fuel ratio by detecting the oxygen concentration in the exhaust gas is provided at the confluence point on the exhaust passage 20 downstream of the branched exhaust channels 21. A three-way catalyst 24 is provided on the exhaust passage 20 downstream of the $O_2$ sensor 23 for performing exhaust gas purification. As is well-known, the three-way catalyst 24 exhibits a high level of purifying performance in respect of HC, CO, and NOx when the air-fuel ratio of the exhaust gas is near the stoichiometric air-fuel ratio (that is, the excess air factor $\lambda$ is $\lambda=1$).

The intake and exhaust valves for opening and closing the intake and exhaust ports of each cylinder and the valve mechanisms thereof are constituted as follows.

An intake valve 31, a first exhaust valve 32a, and a second exhaust valve 32b are respectively provided on the intake port 11, first exhaust port 12a, and second exhaust port 12b in the preceding cylinders 2A, 2D. A first intake valve 31a, a second intake valve 31b, and an exhaust valve 32 are respectively provided on the first intake port 11a, second intake port 11b, and exhaust port 12 in the following cylinders 2B, 2C. These intake and exhaust valves are each driven by a valve mechanism comprising camshafts 33, 34, and the like so as to open and close at a predetermined timing, whereby the intake stroke and exhaust stroke of each cylinder 2A to 2D are performed at a predetermined phase difference such as that described above.

Further, from among these intake and exhaust valves, the first exhaust valve 32a, second exhaust valve 32b, first intake valve 31a, and second intake valve 31b are each provided with a valve stop mechanism 35 for switching the valves between an operative state and a stopped state. The valve stop mechanism 35 is well-known and hence not illustrated in detail, but is constructed, for example, by providing a hydraulic chamber which is capable of supply and discharge of operating fluid in a tappet interposed between the cams of the camshafts 33, 34 and the valve stem such that when operating fluid is supplied to the hydraulic chamber, the action of the cams is transmitted to the valves and the valves open and close, but when operating fluid is discharged from the hydraulic chamber, the action of the cams is no longer transmitted to the valves and the valves close.

Figure 3:
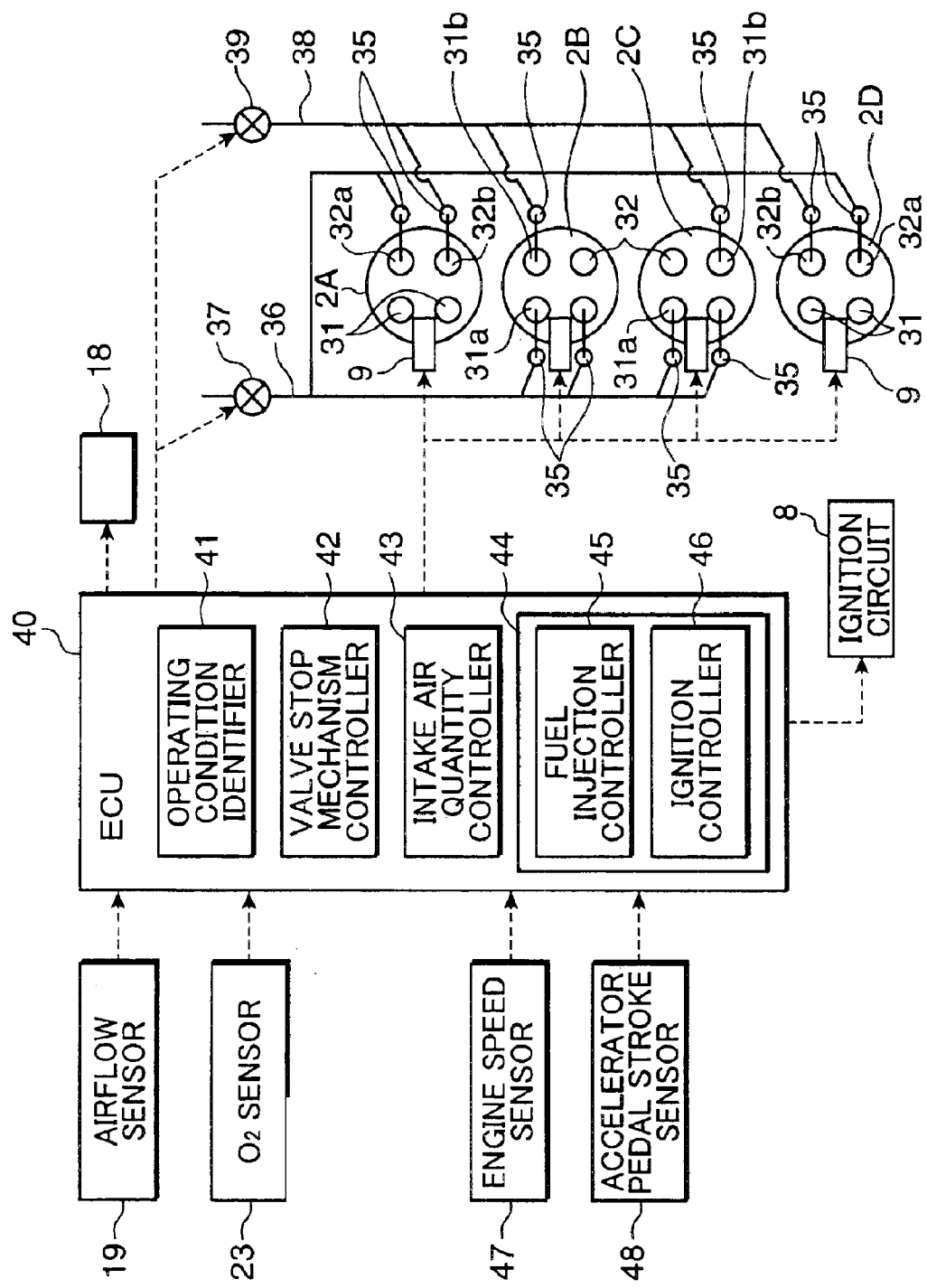
FIG. 3 is a block diagram of a control system.

A first control valve 37 is provided on a passage 36 for supplying and discharging operating fluid to and from the valve stop mechanism 35 of the first exhaust valve 32a and the valve stop mechanism 35 of the first intake valve 31a, and a second control valve 39 is provided on a passage 38 for supplying and discharging operating fluid to and from the valve stop mechanism 35 of the second exhaust valve 32b and the valve stop mechanism 35 of the second intake valve 31b (see FIG. 3).

FIG. 3 shows the constitutions of the driving and control systems. In the drawing, signals from the airflow sensor 19 and $O_2$ sensor 23 are inputted into an ECU (control unit) 40 for controlling the engine, which is constituted by a microcomputer or the like, and signals from an engine speed sensor 47 for detecting the engine speed in order to determine the operating condition, an accelerator pedal stroke sensor 48 for detecting the accelerator pedal stroke (accelerator pedal depression amount), and so on are also inputted. Control signals are outputted from the ECU 40 to the fuel injectors 9, the actuator 18 of the multiple throttle valve 17, and the first and second control valves 37, 39.

The ECU 40 comprises an operating condition identifier 41, a valve stop mechanism controller 42, an intake air quantity controller 43, and a combustion condition controller 44.

Figure 4:
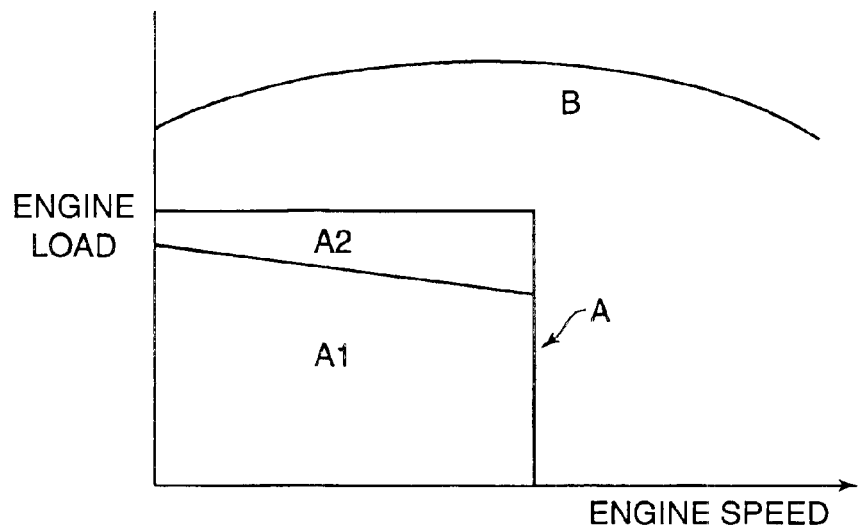
FIG. 4 is an illustrative view showing an example of operating range setting for performing control in accordance with the operating condition.

As shown in FIG. 4, the operating condition identifier 41 comprises a control map in which the engine operating range is divided into a low-load, low-speed side operating range A (partial load range), and a high-load, high-speed side operating range B. The operating condition identifier 41 determines whether the engine operating condition (the engine speed and engine load), which can be checked by the signals from the speed sensor 47, accelerator pedal stroke sensor 48, and so on, is in the operating range A or the operating range B. On the basis of this determination, in the low-load, low-speed side operating range A, a special operation mode is selected, whereby the burned gas discharged from the preceding cylinder in the exhaust stroke is introduced as is into the following cylinder in the intake stroke thereof and then burned, whereas in the high-load, high-speed side operating range B, a normal operation mode is selected, whereby combustion is performed independently in each cylinder.

In the partial load range A in which the special operation mode is selected, the operating condition identifier 41 also functions to determine whether the operating condition is in a high-load side range A2 of the range A or in the remainder of the range, that is a low load side range A1 of the partial load range A.

The valve stop mechanism controller 42 controls the valve stop mechanisms 35 in order to alter the flow of intake air and exhaust gas such that in the special operation mode, a two-cylinder connection is created whereby burned gas from the preceding cylinder is introduced into the following cylinder via the intercylinder gas channel 22, and in the normal operation mode, a state in which each cylinder is independent is created and fresh air is introduced into each cylinder respectively. More specifically, the valve stop mechanism controller 42 controls the control valves 37, 39 in accordance with whether the operating condition is in the operating range A or B, and thereby controls the valve stop mechanisms 35 as follows.

Operating range A:
first exhaust valve 32a and first intake valve 31a are stopped
second exhaust valve 32b and second intake valve 31b are operative Operating range B:
first exhaust valve 32a and first intake valve 31a are operative
second exhaust valve 32b and second intake valve 31b are stopped The intake air quantity controller 43 controls the opening of the throttle valve 17 (throttle opening) by controlling the actuator 18. A target intake air quantity is determined from a map or the like according to the operating condition, and the throttle opening is controlled in accordance with this target intake air quantity. Here, in the operating range A, in which special operation mode is set, combustion is performed in the following cylinders 2B, 2C in a state in which the intake air from the branched intake channels 16 connected to the following cylinders 2B, 2C is blocked, and while maintaining a lean air-fuel ratio between the excess air in the burned gas introduced from the preceding cylinders 2A, 2D and the newly supplied fuel. Hence the throttle opening is adjusted such that air is supplied to the preceding cylinders 2A, 2D in a quantity required for fuel combustion corresponding to the required torque of the two preceding and following cylinders (a sufficient quantity of air to reach the stoichiometric air-fuel ratio with the fuel quantity for two cylinders).

The combustion condition controller 44 is constituted by a fuel injection controller 45 and an ignition controller 46. The fuel injection controller 45 is used to control the fuel injection quantity and injection timing from the fuel injector 9 provided for each cylinder 2A to 2D in accordance with the engine operating condition, and the ignition controller 46 is used to perform ignition timing control, control for halting ignition, and so on in accordance with the operating condition. Combustion control is modified according to whether the engine operating condition is in the operating range A or the operating range B in FIG. 4, and fuel injection timing is modified in accordance with the low-load side range A1 and the high-load side range A2 of the operating range A.

More specifically, when the operating condition is in the operating range A on the low-load, low-speed side at which special operation mode control is executed by an operation mode controller constituted by the valve stop mechanism controller 42 and so on, the fuel injection quantity for the preceding cylinders 2A, 2D is controlled such that the air-fuel ratio reaches a leaner air-fuel ratio than the stoichiometric air-fuel ratio, the injection timing is set such that fuel is injected in the compression stroke to cause stratification of the air-fuel mixture, and the ignition timing is set such that forced ignition is performed in the vicinity of compression top dead center. For the following cylinders 2B, 2C, on the other hand, the fuel injection quantity is controlled such that fuel is supplied to the lean air-fuel ratio burned gas introduced from the preceding cylinders to reach a substantially stoichiometric air-fuel ratio, and forced ignition is halted to allow compression ignition.

In the low-load side range A1 of the operating range A in which special operation mode control is executed, as shown by the solid line in FIG. 5, the injection timing is set such that fuel is injected in the intake stroke of the following cylinders 2B, 2C, whereas in the high-load side range A2 of the operating range A, as shown by the broken line in FIG. 5, the fuel injection timing is retarded relative to that in the low-load side range A1 such that fuel injection timing for the following cylinders 2B, 2C is set to the latter half of the compression stroke of the following cylinders 2B, 2C, or in other words near compression top dead center PTDC. Note that in FIG. 5, the regions indicated by the reference symbols 31, 32b, 31b, and 32 are the periods during which the intake valve 31, second exhaust valve 32b, second intake valve 31b, and exhaust valve 32 are open.

When the engine operating condition is in the high-load, high-speed side operating range B, normal operation mode control is performed to control the fuel injection quantity such that the air-fuel ratio of each cylinder 2A to 2D equals or falls below the stoichiometric air-fuel ratio. For example, in the majority of the operating range B the air-fuel ratio is controlled to the stoichiometric air-fuel ratio, and at full load or an operating range in the vicinity thereof, the air-fuel ratio is controlled to be richer than the stoichiometric air-fuel ratio. In this case, injection timing is set for each cylinder 2A to 2D such that fuel is injected in the intake stroke to obtain a uniform air-fuel mixture, and forced ignition is performed in all of the cylinders 2A to 2D.

The actions of the above-described device of this embodiment will be described with reference to FIGS. 5 through 8. In the low-load, low-speed operating range A, special operation mode is set, and as described above, the first exhaust valve 32a and first intake valve 31a are halted, whereas the second exhaust valve 32b and second intake valve 31b are made operative. In so doing, a substantial fresh air and gas flow path is formed as shown in FIG. 7 to create a two-cylinder connection in which burned gas discharged from the preceding cylinders 2A, 2D is introduced as is into the following cylinders 2B, 2C via the intercylinder gas channels 22, and only the exhaust gas discharged from the following cylinders 2B, 2C is led to the exhaust passage 20.

In this state, fresh air from the intake passage 15 is introduced into each of the preceding cylinders 2A, 2D in the intake stroke (the arrow a in FIG. 7), fuel is injected in the compression stroke while controlling the fuel injection quantity such that the air-fuel ratio of the preceding cylinders 2A, 2D takes a larger value than the stoichiometric air-fuel ratio, for example approximately twice the stoichiometric air-fuel ratio or a slightly smaller value, and ignition is performed at a predetermined ignition timing. Thus stratified charge combustion is performed at a lean air-fuel ratio (see FIG. 6).

Figure 6:
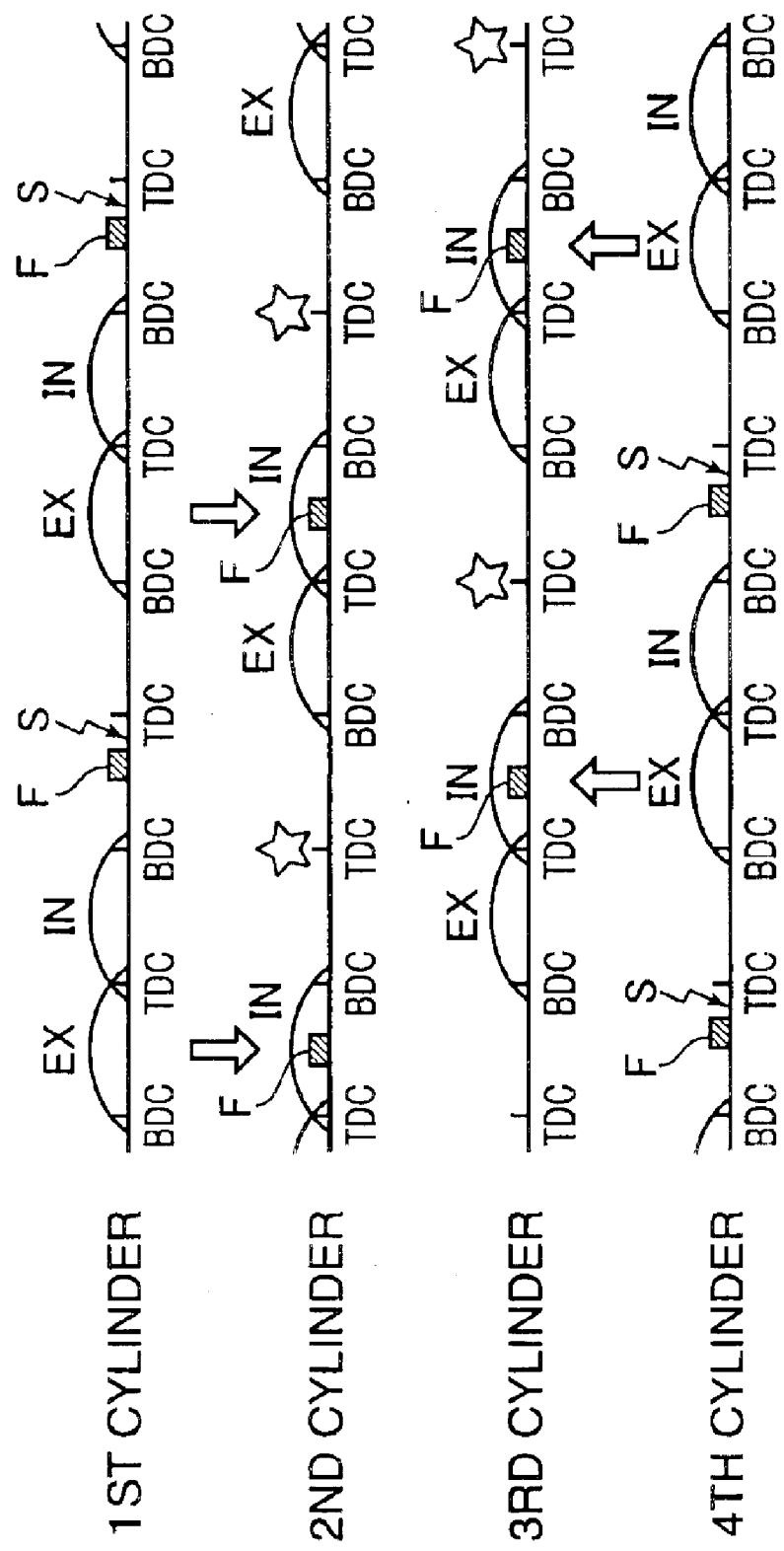
FIG. 6 is a view showing the exhaust stroke, intake stroke, fuel injection timing, ignition timing, and so on of each cylinder.
Figure 7:
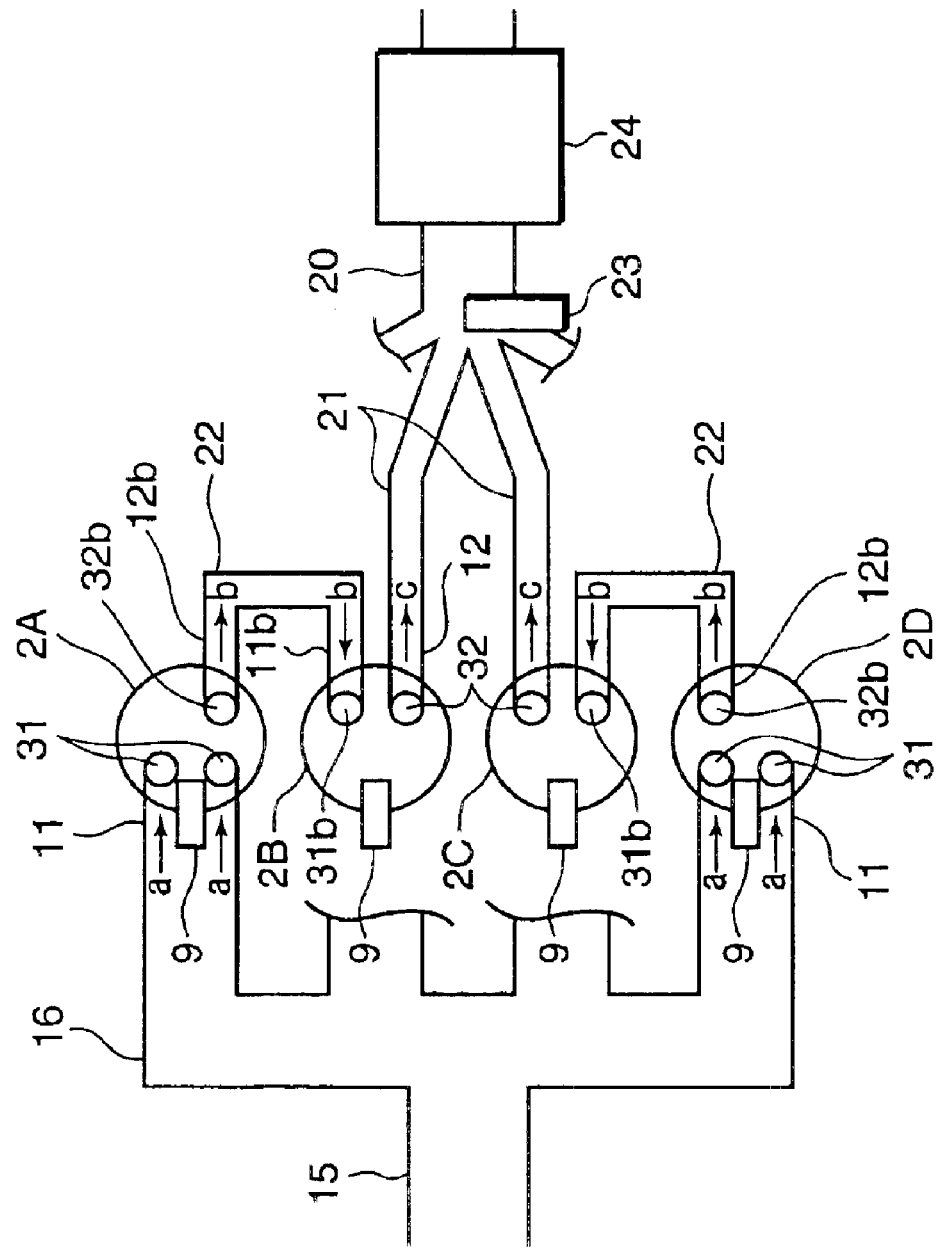
FIG. 7 is an illustrative view showing flow paths of substantially fresh air and gas at low-load and low-speed.

At the point in time when the intake stroke of the preceding cylinders 2A, 2D and the exhaust stroke of the following cylinders 2B, 2C overlap, the burned gas discharged from the preceding cylinders 2A, 2D is introduced into the following cylinders 2B, 2C through the intercylinder gas channels 22 (the outlined arrow in FIGS. 5, 6 and the arrow b in FIG. 7). Fuel is then supplied to the lean air-fuel ratio burned gas introduced from the preceding cylinders 2A, 2D, and while controlling the fuel injection quantity such that the air-fuel ratio of the following cylinders 2B, 2C reaches the stoichiometric air-fuel ratio, the pressure and temperature inside the combustion chamber are raised in the vicinity of the top dead center of the compression stroke, whereby compression ignition is performed in the following cylinders 2B, 2C.

In this case, the high-temperature burned gas discharged from the preceding cylinders 2A, 2D passes through the short intercylinder gas channels 22 and is introduced immediately into the following cylinders 2B, 2C. Hence the temperature inside the combustion chamber of the following cylinders 2B, 2C rises in the intake stroke, and the pressure and temperature rise further in the compression stroke, and thus in the vicinity of top dead center in the final phase of the compression stroke, the temperature inside the combustion chamber rises to the extent that the air-fuel mixture can self-ignite. Moreover, the burned gas is sufficiently mixed from being discharged from the preceding cylinders 2A, 2D to being introduced into the following cylinders 2B, 2C, and thus is distributed uniformly. In particular, when fuel is injected in the intake stroke as described above, the fuel is distributed uniformly through the entire combustion chamber by the final phase of the compression stroke, and thus a state of uniform air-fuel mixture distribution is obtained, thereby satisfying the conditions for ideal simultaneous compression ignition. As a result, combustion by simultaneous compression ignition is performed rapidly, leading to a large improvement in thermal efficiency.

Hence in the preceding cylinders 2A, 2D, thermal efficiency is increased by means of lean stratified charge combustion, and thus in comparison with a normal engine in which stratified charge combustion is not performed, manifold air pressure decreases, leading to a reduction in pumping loss. In the following cylinders 2B, 2C, meanwhile, compression ignition is performed in a state of uniform air-fuel mixture distribution while maintaining the air-fuel ratio at a substantially stoichiometric air-fuel ratio, thereby raising thermal efficiency, and since the gas discharged from the preceding cylinders 2A, 2D is taken in, an even greater reduction in pumping loss can be achieved than in the preceding cylinders 2A, 2D. As a result of these actions, fuel economy is greatly improved.

Further, since the exhaust gas discharged from the following cylinders 2B, 2C to the exhaust passage 20 is at the stoichiometric air-fuel ratio, there is no need to provide a lean NOx catalyst as in a conventional lean burn engine, and a sufficient exhaust purification performance can be ensured by the three-way catalyst 24 alone. Since no lean NOx catalyst need be provided, there is no need to temporarily enrich the air-fuel ratio in order to release and reduce NOx when the amount of NOx adsorbed by the lean NOx catalyst increases, and thus a decrease in the level of fuel economy improvement can be avoided. Moreover, the problem of sulfur poisoning of the lean NOx catalyst does not arise.

By setting a lean air-fuel ratio in the preceding cylinders 2A, 2D of approximately twice the stoichiometric air-fuel ratio or a value in the vicinity thereof, the amount of generated NOx can be suppressed to a comparatively low level. Meanwhile, burned gas from the preceding cylinders 2A, 2D is introduced into the following cylinders 2B, 2C, creating a similar state to one in which a large amount of EGR is performed. By performing rapid combustion through simultaneous compression ignition, an oxygen-nitrogen reaction can be avoided as far as possible, and as a result, NOx generation is sufficiently suppressed. These points are also beneficial in terms of emissions reduction.

Since the compression ignition in the following cylinders 2B, 2C is achieved using the heat of the burned gas discharged from the preceding cylinders 2A, 2D, there is no need to use special heating means or to greatly increase the compression ratio of the engine, and thus compression ignition can be achieved easily. Further, by adjusting the timing of fuel injection into the following cylinders 2B, 2C in the operating range A, in which special operation mode control is executed, according to the operating condition as described above, heavy knocking does not occur, and compression ignition can be performed effectively over a wide operating range.

In the low-load side range A1 of the operating range A in which special operation mode is set, compression ignition is more difficult to perform than in the high-load side range A2. However, by setting the fuel injection timing to a point during the intake stroke as described above, the fuel and air (the lean air-fuel ratio burned gas discharged from the preceding cylinders 2A, 2D) are mixed sufficiently to achieve good combustibility, and hence even in the low speed range A1, compression ignition is performed effectively.

In the high-load side range A2 of the operating range A in which special operation mode is set, although compression ignition is easy to perform due to the temperature inside the combustion chamber being higher than in the low-load side range A1, heavy knocking tends to occur in the following cylinders 2B, 2C. By retarding the fuel injection timing to the vicinity of compression top dead center PTDC, however, compression ignition is performed without excessive activation of the air-fuel mixture following fuel injection, and hence heavy knocking caused by the air-fuel mixture spontaneously igniting before the flame propagates through the combustion chamber can be prevented.

Figure 8:
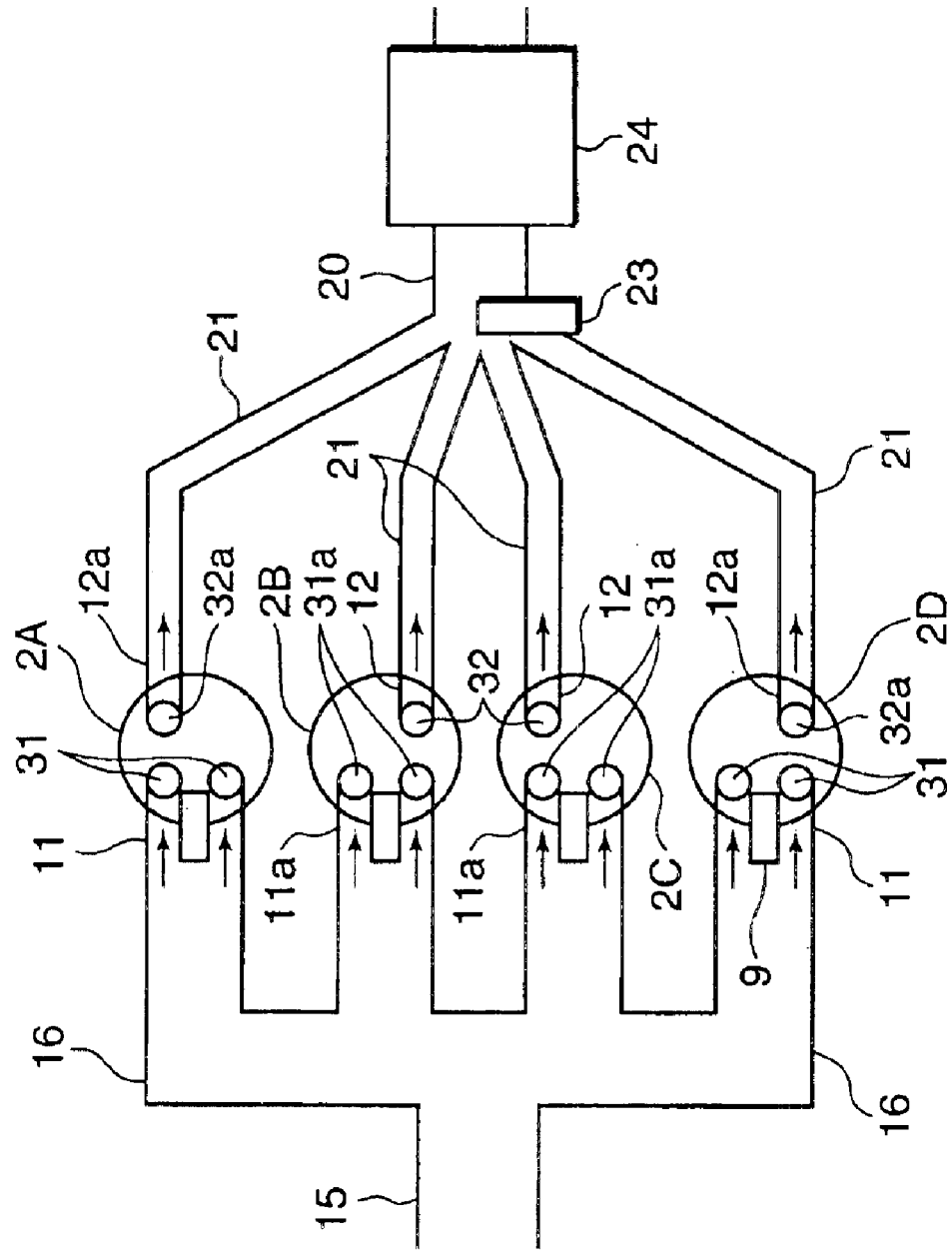
FIG. 8 is an illustrative view showing the flow paths of substantially fresh air and gas in a high-load, high-speed side operating range.

In the high-load, high-speed side operating range B, normal operation mode is set, and as described above, the first exhaust valve 32a and first intake valve 31a are made operative, and the second exhaust valve 32b and second intake valve 31b are stopped. In so doing, a substantially fresh air and gas flow path is formed as shown in FIG. 8 such that the intake ports 11, 11a and exhaust ports 12a, 12 of each cylinder 2A to 2D become independent. Fresh air is then introduced into the intake ports 11, 11a of each cylinder 2A to 2D from the intake passage 15, and burned gas from the exhaust ports 12, 12a of each cylinder 2A to 2D is discharged into the exhaust passage 20. In this case, the intake air quantity and fuel injection quantity are controlled such that the air-fuel ratio equals or becomes richer than the stoichiometric air-fuel ratio, thereby ensuring output performance.

When an operating condition in which heavy knocking occurs easily is confirmed within the operating range A, in which compression ignition is performed in the following cylinders 2B, 2C as described above, or in other words an operating condition in the high-load side operating range A2, the timing of fuel injection into the following cylinders 2B, 2C is relatively retarded, and thus activation of the air-fuel mixture is suppressed. As a result, heavy knocking caused when the ignitability of the air-fuel mixture is too good can be effectively prevented. Furthermore, when an operating condition in which heavy knocking is unlikely to occur is confirmed within the compression ignition range of the following cylinders 2B, 2C, or in other words an operating condition in the low-load side range A1, the timing of fuel injection into the following cylinders 2B, 2C is relatively advanced, and thus activation of the air-fuel mixture is encouraged. As a result, misfires in the following cylinders 2B, 2C can be effectively prevented and combustion through compression ignition can be performed securely. Hence an effect of improving the thermal efficiency of the engine is obtained, and the engine output is sufficiently ensured.

In the case of an operating condition in which heavy knocking occurs easily in the compression ignition range of the following cylinders 2B, 2C, activation of the air-fuel mixture is suppressed particularly effectively by setting the timing of fuel injection into the following cylinders 2B, 2C to the latter half of the compression stroke, as illustrated in the embodiment described above, whereby heavy knocking can be reliably suppressed.

Figure 9:
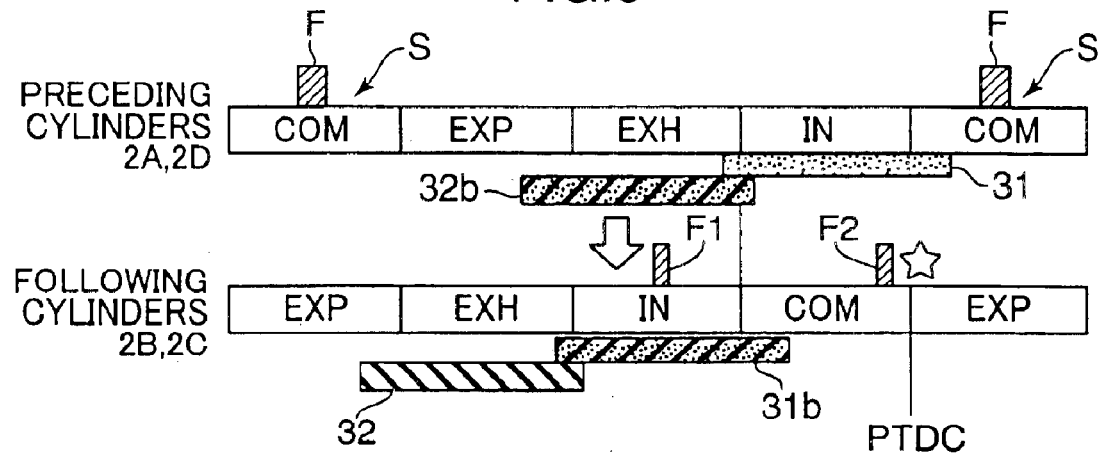
FIG. 9 is an illustrative view showing another example of the combustion cycle of the preceding cylinder and following cylinder.

Note that when an operating condition in which heavy knocking occurs easily is confirmed within the operating range A where compression ignition is performed in the following cylinders 2B, 2C, or in other words an operating condition in the high-load, high-speed range A2, fuel may be injected into the following cylinders 2B, 2C in portions, and a latter stage fuel injection timing F2 during this portioned injection may be set to the latter half of the compression stage, as shown in FIG. 9. In so doing, the portion of fuel injected in the first stage, which is injected at a first stage injection timing F1 during the aforementioned portioned injection, or in other words at a point during the intake stroke of the following cylinders 2B, 2C, is sufficiently mixed with air, and thus the portion of fuel injected in the latter stage, which is injected at the aforementioned latter stage injection timing F2, is appropriately prevented from mixing with air while combustibility is maintained. As a result, heavy knocking can be effectively prevented.

A constitution may also be provided in which, in the operating range A where compression ignition is performed in the following cylinders 2B, 2C, the probability of heavy knocking occurring is determined according to the engine load and so on, and the greater the probability of heavy knocking occurrence, the greater the degree to which the latter stage injection timing F2 during the aforementioned portioned fuel injection is retarded toward compression top dead center. By altering the latter stage injection timing F2 in accordance with the probability of heavy knocking occurrence in this manner, the occurrence of heavy knocking on the high-load side of the engine, at which the temperature within the combustion chamber has a tendency to rise, can be effectively prevented while also effectively preventing the occurrence of misfires on the low-load side of the engine, at which the temperature inside the combustion chamber has a tendency to fall.

Further, in the case of an operating condition in which heavy knocking occurs easily within the operating range A, where compression ignition is performed in the following cylinders 2B, 2C, fuel may be injected into the following cylinders 2B, 2C in portions, and the quantity of fuel injected in the latter stage of this portioned injection may be set to a larger value than that of the quantity of fuel in the first stage. According to this constitution, when it is confirmed that the engine is in an operating condition within the compression ignition range of the following cylinders where heavy knocking caused by high temperatures within the combustion chamber of the following cylinders 2B, 2C and so on is likely to occur, the quantity of fuel injected in the latter stage of portioned injection into the following cylinders 2B, 2C is set to a larger value than the quantity of fuel injected in the first stage, and thus activation of the air-fuel mixture in the operating range A2, where the probability of heavy knocking occurrence is high, can be effectively suppressed, thereby preventing heavy knocking with even more certainty.

In the operating range A, where compression ignition is performed in the following cylinders 2B, 2C, the probability of heavy knocking occurrence is preferably determined such that as the probability of heavy knocking occurrence rises, the proportion of the latter stage injection quantity to the total quantity of fuel injected into the following cylinders is increased. By altering the latter stage fuel injection quantity according to the probability of heavy knocking occurrence in the compression ignition range of the following cylinders 2B, 2C, the occurrence of heavy knocking on the high-load side of the engine, at which the temperature within the combustion chamber has a tendency to rise, can be effectively prevented while also effectively preventing the occurrence of misfires on the low-load side of the engine, at which the temperature inside the combustion chamber has a tendency to fall.

In the embodiment described above, when the engine is in the high-load operating range A2 within the operating range in which compression ignition is performed in the following cylinders 2B, 2C, it is determined that heavy knocking is likely to occur, and thus a simple and appropriate determination can be made as to whether or not the temperature inside the combustion chambers of the following cylinders 2B, 2C is likely to rise according to the engine load. Hence an accurate determination can be made on the basis of the engine load as to whether or not the engine is in an operating condition where heavy knocking is likely to occur in the following cylinders 2B, 2C, and the timing of fuel injection into the following cylinders 2B, 2C can be controlled appropriately according to the result of this determination.

Note that determination means may be provided for determining the octane number of the fuel in use, and a determination as to whether heavy knocking is likely to occur in the compression ignition range of the following cylinders 2B, 2C may be made according to the determination result of these determination means. More specifically, heavy knocking becomes more likely to occur as the octane number of the fuel in use falls, and thus when the determination means determine that fuel with a low octane number is being used, it is determined that the engine is in an operating condition within the compression ignition operating range of the following cylinders 2B, 2C where heavy knocking is likely to occur. The determination means, thus, functions as a means to determine likely occurrence of the heavy knocking thus it is also referred to as a knocking determination unit in this specification. The timing of fuel injection into the following cylinders 2B, 2C may then be appropriately controlled according to the result of the determination.

Further, in the case of an operating range where heavy knocking is likely to occur within the operating range A where compression ignition is performed in the following cylinders 2B, 2C, it is preferable that a swirl generator for generating swirl be provided such that a high turbulence intensity is maintained in the latter half of the compression stroke. According to this constitution, in the case of an operating range where heavy knocking is likely to occur within the compression ignition range of the following cylinders 2B, 2C, reductions in combustibility caused by retarding the fuel injection timing can be amended in accordance with the swirl generating by the swirl generator. As a result, the effects of an improvement in combustibility enabled by maintaining a high turbulence intensity in the latter half of the compression stroke in accordance with the swirl and suppression of heavy knocking enabled by retarding the timing of fuel injection into the following cylinders toward compression top dead center can be achieved simultaneously.

Figure 10:
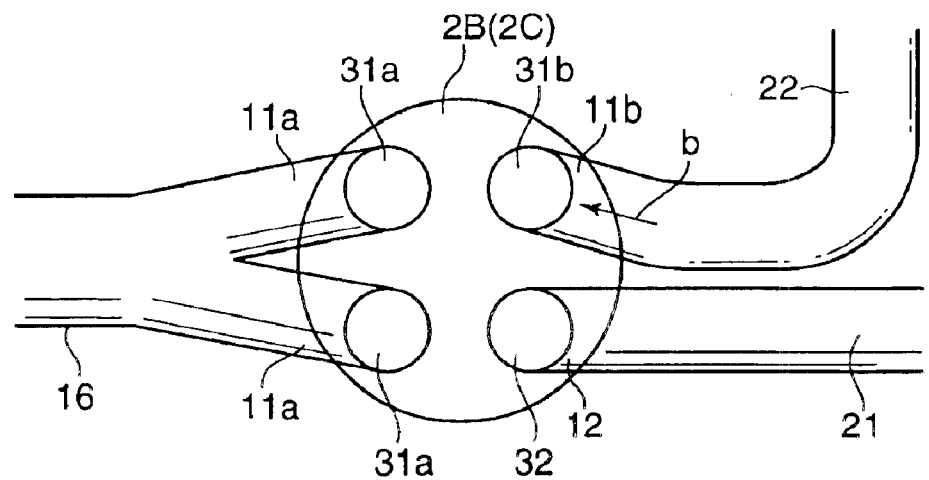
FIG. 10 is an illustrative view showing the specific constitution of a swirl generator.

As shown in FIG. 10, for example, the tip end part of the intercylinder gas channel 22, or in other words the downstream side end portion of the intercylinder gas channel 22 which is connected to the second intake port 11b of the following cylinders 2B, 2C, is disposed so as to be oriented in a tangential direction to the following cylinders 2B, 2C when seen from above. Then, in the intake stroke of the following cylinders 2B, 2C, the second exhaust port 12b of the preceding cylinders 2A, 2D is opened such that the burned gas from the preceding cylinders 2A, 2D is introduced into the intercylinder gas channel 22, and the second intake port 11b of the following cylinders 2B, 2C is opened such that the burned gas is introduced into the combustion chamber from the intercylinder gas channel 22 in a tangential direction (the direction of arrow b in FIG. 10) to the following cylinders 2B, 2C. Thus swirl can be generated in the combustion chambers of the following cylinders 2B, 2C, and by maintaining the turbulence intensity of this swirl at a high level in the latter half of the combustion stroke, the combustibility of the following cylinders 2B, 2C can be effectively improved.

Note that the specific constitution of the device of the present invention is not limited to the embodiment described above, and may be modified in various ways. Other embodiments will be described below. More specifically, in the embodiments described above, combustion in the following cylinders 2B, 2C is performed by compression ignition in the whole of the operating range A in which special operation mode is set. However, in a part of the operating range A in which special operation mode is set, for example an ultra-low-speed, low-load range in which the temperature and pressure inside the combustion chamber cannot easily be raised to a level at which compression ignition is possible, ignition may be performed in the following cylinders 2B, 2C by the spark plug 7 at a predetermined ignition timing, thereby enabling combustion through forced ignition. Alternatively, combustion may be performed in the following cylinders 2B, 2C by forced ignition when the engine temperature is low.

Further, in the embodiment described above, the valve stop mechanisms 35 are used to switch between intake and exhaust flow in a state of two-cylinder connection or cylinder independence. However, an open/close valve may be provided on the intake and exhaust passages and the intercylinder gas channels to open and close these passages and channels, and thereby enable switching between a two-cylinder connection and cylinder independence.

Moreover, the device of the present invention may be applied to a multi-cylinder engine other than a four-cylinder engine. In a six-cylinder engine or the like, for example, the exhaust stroke of one cylinder and the intake stroke of another cylinder do not overlap perfectly, but in such a case, the exhaust stroke of one cylinder may precede the intake stroke of the other cylinder, and two cylinders having partially overlapping strokes may be set as the preceding and following cylinder pairs.

According to the controller of the present invention as described above, when special operation mode is set, combustion is performed at a lean air-fuel ratio in the preceding cylinder of a pair of cylinders having an overlapping exhaust stroke and intake stroke, whereas in the following cylinder, burned gas with a lean air-fuel ratio, which is introduced from the preceding cylinder, is supplied with fuel such that combustion is performed by compression ignition. Hence in the preceding cylinder, thermal efficiency is improved as a result of the lean combustion and pumping loss is decreased, and in the following cylinder combustion efficiency is improved as a result of the compression ignition and pumping loss is decreased, thereby enabling an improvement in fuel economy. Furthermore, the air-fuel ratio during combustion in the following cylinder is substantially equal to the stoichiometric air-fuel ratio, and hence exhaust gas in the exhaust passage can be sufficiently purified by a three-way catalyst alone, rendering a lean NOx catalyst unnecessary.

In particular in the present invention, when the engine is in an operating condition in which heavy knocking occurs easily within the operating range where special operation mode is set, the timing of fuel injection into the following cylinder is retarded relative to the fuel injection timing in an operating condition where heavy knocking is unlikely to occur. Thus activation of the air-fuel mixture is suppressed, enabling effective prevention of heavy knocking caused when the ignitability of the mixture is too good. In the case of an operating condition in which heavy knocking is unlikely to occur within the aforementioned operating range, the timing of fuel injection into the following cylinder is set to a relatively early timing, thereby encouraging air-fuel mixture activation such that misfires in the following cylinder can be effectively prevented and combustion through compression ignition can be ensured. As a result, an improvement in the thermal efficiency of the engine is obtained, and the engine output can be sufficiently ensured.

In summary, an invention according to the present invention relates to a spark-ignition engine controller for a multi-cylinder spark-ignition engine set such that the combustion cycle of each cylinder has a predetermined phase difference, comprising: an operation mode controller for performing control such that a control mode for engine intake, exhaust, and combustion in a partial load range of the engine is set as a special operation mode, and in the special operation mode a two-cylinder connection is maintained in which burned gas discharged in the exhaust stroke of a preceding cylinder of a pair of cylinders having an overlapping exhaust stroke and intake stroke is introduced as is into a following cylinder during the intake stroke thereof through an intercylinder gas channel and exhaust gas discharged from the following cylinder is introduced into an exhaust passage, while combustion is performed in the preceding cylinder at a leaner air-fuel ratio than the stoichiometric air-fuel ratio, and combustion is performed in the following cylinder by feeding fuel to the lean air-fuel ratio burned gas introduced into the following cylinder from the preceding cylinder; a combustion condition controller for performing control such that in the operating range set as the special operation mode, combustion is performed in the following cylinder by compression ignition; and a fuel injection controller which, in an operating condition in a low load range within the compression ignition range of said following cylinder, sets the fuel injection timing into the following cylinder in an intake stroke and which, in an operating condition in a high load range within the compression ignition range of said following cylinder, retards the fuel injection timing into the following cylinder to be in a later half of the compression stroke.

According to the aforementioned form of the present invention, when the special operation mode is set in a partial operating range of the engine and combustion is performed in the following cylinder by compression ignition, the effects of an improvement in thermal efficiency due to lean-burn and an improvement in fuel economy due to a reduction in pumping loss are obtained in the preceding cylinder, and the effects of an improvement in combustion efficiency due to compression ignition and an improvement in fuel economy due to a reduction in pumping loss are obtained in the following cylinder. When it is confirmed that the engine is in an operating condition where heavy knocking is likely to occur within the compression ignition range of the following cylinder, the timing of fuel injection into the following cylinder is relatively retarded, and thus activation of the air-fuel mixture is suppressed, effectively preventing the occurrence of heavy knocking caused when the ignitability of the mixture is too good. When it is confirmed that the engine is in an operating condition where heavy knocking is unlikely to occur within the compression ignition range of the following cylinder, the timing of fuel injection into the following cylinder is relatively advanced, thereby encouraging activation of the air-fuel mixture. As a result, misfires in the following cylinder are effectively prevented, an improvement in thermal efficiency due to compression ignition is obtained, and the engine output can be sufficiently ensured.

In the aforementioned form of the invention, when an operating condition in which heavy knocking is likely to occur within the compression ignition range of the following cylinder, the timing of fuel injection into the following cylinder may be set to the latter half of the compression stroke.

According to this constitution, when it is confirmed that the engine is in an operating condition within the compression ignition range of the following cylinder where heavy knocking caused by high temperatures within the combustion chamber of the following cylinder and so on is likely to occur, the timing of fuel injection into the following cylinder is relatively retarded to the latter half of the compression stroke, thereby appropriately suppressing activation of the air-fuel mixture such that the occurrence of heavy knocking is effectively prevented.

In addition, in the aforementioned form of the invention, when an operating condition in which heavy knocking is likely to occur, fuel is injected into the following cylinder in portions, and the timing of fuel injection in the latter stage of this portioned injection can be preferably set to the latter half of the compression stroke.

According to this constitution, when it is confirmed that the engine is in an operating condition within the compression ignition range of the following cylinder where heavy knocking caused by high temperatures within the combustion chamber of the following cylinder and so on is likely to occur, fuel is injected into the following cylinder in portions, and the timing of fuel injection in the latter stage of this portioned injection is set to the latter half of the compression stroke. Thus activation of the air-fuel mixture is suppressed appropriately such that heavy knocking and misfires are effectively prevented simultaneously.

Furthermore, when the compression ignition range of the following cylinder, the probability of heavy knocking occurrence is determined, and the latter stage injection timing during the portioned fuel injection may be retarded further toward compression top dead center as the probability of heavy knocking occurrence increases.

According to this constitution, the latter stage injection timing of the fuel which is injected in portions into the following cylinder is controlled in accordance with the probability of heavy knocking occurrence, which is determined in relation to the temperature inside the combustion chamber of the following cylinder and the like. By retarding the latter stage fuel injection timing further toward compression top dead center as the probability of heavy knocking occurrence rises, activation of the air-fuel mixture is suppressed in regions with a high probability of heavy knocking, and thus the occurrence of heavy knocking is effectively prevented.

Moreover, when an operating condition in which heavy knocking is likely to occur, fuel is injected into the following cylinder in portions, and the quantity of fuel injected in the latter stage of the portioned injection can be set to a greater value than the quantity of fuel injected in a first stage.

According to this constitution, when it is confirmed that the engine is in an operating condition within the compression ignition range of the following cylinder where heavy knocking caused by high temperatures in the combustion chamber of the following cylinder and so on is likely to occur, fuel is injected into the following cylinder in portions, and the quantity of fuel injected in the latter stage of the portioned injection is set to a greater value than the injection quantity in the first stage. As a result, activation of the air-fuel mixture is suppressed appropriately such that heavy knocking and misfires can be effectively prevented simultaneously.

Yet, moreover, when the compression ignition range of the following cylinder, the probability of heavy knocking occurrence is determined, and the proportion of the latter stage injection quantity to a total injection quantity of fuel injected into the following cylinder may be increased as the probability of heavy knocking occurrence rises.

According to this constitution, the quantity of fuel injected into the following cylinder is controlled in accordance with the probability of heavy knocking occurrence, which is determined in relation to the temperature inside the combustion chamber of the following cylinder and the like, such that the proportion of the latter stage injection quantity of the fuel injected into the following cylinder in portions is set to increase as the probability of heavy knocking occurrence rises. Thus activation of the air-fuel mixture is further suppressed and heavy knocking is prevented even more effectively.

Furthermore, when the engine is in a high-load side operating range within the compression ignition range of the following cylinder, heavy knocking is determined to be likely to occur.

According to this constitution, when the engine is in a high-load side operating range within the compression ignition range of the following cylinder, the temperature inside the combustion chamber of the following cylinder has a tendency to rise, and hence, in accordance with this fact, an accurate determination is made as to whether or not the engine is in an operating condition where heavy knocking is likely to occur. The timing of fuel injection into the following cylinder is then appropriately controlled according to the result of this determination.

In addition, when low-octane fuel is used, heavy knocking is determined to be likely to occur in the compression ignition range of the following cylinder.

According to this constitution, in the compression ignition range of the following cylinder, an accurate determination as to whether or not the engine is in an operating condition where heavy knocking is likely to occur is made in accordance with the octane number of the fuel in use, and the timing of fuel injection into the following cylinder is appropriately controlled according to the result of this determination.

In addition, the aforementioned spark-ignition engine controller may further comprise a swirl generator for generating swirl such that when the engine is in an operating condition in which heavy knocking is likely to occur within the compression ignition range of the following cylinder, a high turbulence intensity is maintained in the latter half of the compression stroke.

According to the above configuration, when it is confirmed that the engine is in an operating condition within the compression ignition range of the following cylinder where heavy knocking caused by high temperatures in the combustion chamber of the following cylinder and so on is likely to occur, an improvement in combustibility is obtained by maintaining a high turbulence intensity in the latter half of the compression stroke by means of the swirl generated by the swirl generator, and at the same time the suppression of heavy knocking is achieved by retarding the timing of fuel injection into the following cylinder toward compression top dead center.

In the above configuration, an end part of the intercylinder gas channel is oriented in a tangential direction to the following cylinder when seen from above, and burned gas may be introduced from the intercylinder gas channel into the following cylinder in the intake stroke of the following cylinder such that swirl is generated inside the combustion chamber.

According to the above configuration, when it is confirmed that the engine is in an operating condition within the compression ignition range of the following cylinder where heavy knocking caused by high temperatures in the combustion chamber of the following cylinder and so on is likely to occur, the intercylinder gas channel becomes conductive in the intake stroke of the following cylinder such that burned gas discharged from the preceding cylinder is introduced into the following cylinder. As a result, swirl is formed so as to maintain a high turbulence intensity in the latter half of the compression stroke, and combustibility in the following cylinder is maintained in a favorable state.

This application is based on Japanese patent application serial no. 2002-292875, filed in Japan Patent Office on Oct. 4, 2002, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A spark-ignition engine controller for a multi-cylinder spark ignition engine set such that the combustion cycle of each cylinder has a predetermined phase difference, said spark-ignition engine controller comprising:
   an operation mode controller for performing control such that a control mode for engine intake, exhaust, and combustion in a partial load range of the engine is set as a special operation mode, and in the special operation mode a two-cylinder connection is maintained in which burned gas discharged in the exhaust stroke of a preceding cylinder of a pair of cylinders having an overlapping exhaust stroke and intake stroke is introduced as is into a following cylinder during the intake stroke thereof through an intercylinder gas channel and exhaust gas discharged from the following cylinder is introduced into an exhaust passage, while combustion is performed in the preceding cylinder at a leaner air-fuel ratio than the stoichiometric air-fuel ratio, and combustion is performed in the following cylinder by feeding fuel to the lean air-fuel ratio burned gas introduced into the following cylinder from the preceding cylinder;
   a combustion condition controller for performing control such that in the operating range set as said special operation mode, combustion is performed in the following cylinder by compression ignition; and
   a fuel injection controller which, in an operating condition in a low load range within the compression ignition range of said following cylinder, sets the fuel injection timing into the following cylinder in an intake stroke and which, in an operating condition in a high load range within the compression ignition range of said following cylinder, retards the fuel injection timing into the following cylinder to be in a later half of the compression stroke.

2. The spark-ignition engine controller according to claim 1, wherein, in an operating condition in which knocking is likely to occur within the compression ignition range of the following cylinder, fuel is injected into the following cylinder in split, and the timing of fuel injection in a later stage of said split injection is set to the latter half of the compression stroke.

3. The spark-ignition engine controller according to claim 2, wherein, in the compression ignition range of the following cylinder, the probability of knocking occurrence is detected, and the later stage injection timing during said split fuel injection is retarded further towards top dead center of compression stroke as the probability of knocking occurrence increases.

4. The spark-ignition engine controller according to claim 2, wherein, in an operating condition in a low load range within the compression ignition range of the following cylinder, a fuel injection timing into the preceding cylinder is set to be in a compressed stroke for enabling a stratified charge combustion and a fuel injection timing to the following cylinder is set to be in an intake stroke for enabling a compression ignition in a uniformly dispersed fuel mixture, and in an operating condition in a high load range within the compression ignition range of the following cylinder, a fuel injection timing into the following cylinder is set to be at least one in the compression stroke.

5. The spark-ignition engine controller according to claim 4, wherein, in the compression ignition range of the following cylinder, the probability of knocking occurrence is detected, and the proportion of the latter stage injection quantity with respect to a total injection quantity of fuel injected into the following cylinder is increased as the probability of knocking occurrence rises.

6. The spark-ignition engine controller according to claim 1, further comprising a knocking determination unit that determines knocking likely occurs when a low-octane fuel is used, the more likely knocking is determined to occur in the compression ignition range of the following cylinder according to the knocking determination unit, the more retarded a fuel injection timing into the following cylinder is set.

7. The spark-ignition engine controller according to claim 1, further comprising a swirl generator for generating swirl such that when the engine is in an operating condition in which knocking is likely to occur within the compression ignition range of the following cylinder, a high turbulence intensity is maintained in the latter half of the compression stroke.

8. The spark-ignition engine controller according to claim 7, wherein an end part of the intercylinder gas channel is oriented in a tangential direction to the following cylinder when seen from a cylinder axial direction, and burned gas is introduced from said intercylinder gas channel into the following cylinder in the intake stroke of the following cylinder such that swirl is generated inside the combustion chamber.

* * * * *